United States Patent
Baca et al.

(10) Patent No.: US 10,955,625 B2
(45) Date of Patent: Mar. 23, 2021

(54) FIBER OPTIC CABLE ASSEMBLY INCLUDING A COMPOSITE FOR RETAINING STRENGTH MEMBERS AND ASSOCIATED METHOD

(71) Applicant: CORNING RESEARCH & DEVELOPMENT CORPORATION, Corning, NY (US)

(72) Inventors: Adra Smith Baca, Hickory, NC (US); Micah Colen Isenhour, Lincolnton, NC (US); Robert Max Sanetick, Denver, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/659,741

(22) Filed: Oct. 22, 2019

(65) Prior Publication Data
US 2020/0132945 A1 Apr. 30, 2020

Related U.S. Application Data

(60) Provisional application No. 62/752,433, filed on Oct. 30, 2018.

(51) Int. Cl.
*G02B 6/38* (2006.01)
*G02B 6/44* (2006.01)

(52) U.S. Cl.
CPC .......... *G02B 6/3889* (2013.01); *G02B 6/4432* (2013.01)

(58) Field of Classification Search
CPC .............................. G02B 6/3889; G02B 6/4432
See application file for complete search history.

(56) References Cited

U.S. PATENT DOCUMENTS

| 4,920,366 | A | * | 4/1990 | Bowen | G02B 6/3855 |
| | | | | | 385/55 |
| 4,925,507 | A | | 5/1990 | Yamaguchi | |
| 5,049,274 | A | | 9/1991 | Leason et al. | |
| 5,186,776 | A | | 2/1993 | Boyce et al. | |
| 5,923,804 | A | * | 7/1999 | Rosson | G02B 6/3869 |
| | | | | | 385/81 |
| 6,419,402 | B1 | * | 7/2002 | Zimmel | G02B 6/3869 |
| | | | | | 385/86 |

(Continued)

FOREIGN PATENT DOCUMENTS

| JP | 60179708 A | | 9/1985 | |
| JP | 61009611 A | * | 1/1986 | ............... G02B 6/38 |

OTHER PUBLICATIONS

International Search Report and Written Opinion of the European International Searching Authority; PCT/US2019/055530; dated Jan. 7, 2020; 11 Pgs.

*Primary Examiner* — Daniel Petkovsek
(74) *Attorney, Agent, or Firm* — Kapil U. Banakar

(57) ABSTRACT

A fiber optic cable assembly includes a fiber optic cable including at least one strength member and a fiber optic connector including a connector body. The assembly also includes a weld collar positioned such that the at least one strength member is at least partially captured between the connector body and the weld collar. The assembly further includes a composite including a portion of the at least one strength member and a portion of at least one of the weld collar or the connector body. A method of coupling a fiber optic cable to a fiber optic connector is also provided.

21 Claims, 5 Drawing Sheets

(56) References Cited

U.S. PATENT DOCUMENTS

| | | | |
|---|---|---|---|
| 6,565,261 B1 | 5/2003 | Uchiyama et al. | |
| 6,672,774 B2 | 1/2004 | Theuerkorn et al. | |
| 7,537,393 B2 * | 5/2009 | Anderson | G02B 6/3885 |
| | | | 385/100 |
| 8,942,528 B2 * | 1/2015 | Theuerkorn | G02B 6/4256 |
| | | | 385/113 |
| 2009/0297102 A1 | 12/2009 | Kachmar | |
| 2017/0043526 A1 | 2/2017 | Ohki et al. | |

* cited by examiner

FIBER OPTIC CABLE ASSEMBLY INCLUDING A COMPOSITE FOR RETAINING STRENGTH MEMBERS AND ASSOCIATED METHOD

PRIORITY APPLICATION

This application claims the benefit of priority of U.S. Provisional Application No. 62/752,433, filed on Oct. 30, 2018, the content of which is relied upon and incorporated herein by reference in its entirety.

TECHNICAL FIELD

This disclosure relates generally to optical connectivity, and more particularly to a fiber optic cable assembly including a composite for retaining strength members of a fiber optic cable, and an associated method of coupling a fiber optic cable to a fiber optic connector.

BACKGROUND

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

The assembly of connectors involve several steps, including mechanically coupling the fiber optic cable to fiber optic connector. In many connectors, such as LC-type and SC-type connectors, this step includes crimping the strength members of the cable, such as aramid fibers, to the connector. This typically involves crimping directly on a molded plastic body which is part of the connector. In some instances, the resulting stress/strain distribution can make these parts susceptible to failure due to breaking of the plastic body. For both plastic and non-plastic bodies, crimping of the strength members can result in additional defects, such as in cases where the strength members (1) are not uniformly distributed around the body, (2) are not the correct length for the particular product, and/or (3) are crimped incorrectly, such as by applying an improper (e.g., excessive or insufficient) crimping force. Each of these defects or failure modes may be difficult to detect. Additionally, the use of metal components such as metal crimp bands in these applications to supplement or replace the plastic components may be more costly relative to the plastic components.

Accordingly, there exists a need for an improved fiber optic cable assembly that addresses these and other deficiencies of the prior art.

SUMMARY

In one embodiment, a fiber optic cable assembly includes a fiber optic cable including at least one strength member and a fiber optic connector including a connector body. The assembly also includes a weld collar positioned such that the at least one strength member is at least partially captured between the connector body and the weld collar. The assembly further includes a composite including a portion of the at least one strength member and a portion of at least one of the weld collar or the connector body. The composite may include a portion of the weld collar and a portion of the connector body. In addition or alternatively, the composite may be formed by ultrasonically welding the weld collar to the connector body. In one embodiment, the weld collar comprises a plastic material.

The connector body or the weld collar may include a plurality of longitudinally-extending teeth defining a plurality of recesses for receiving the at least one strength member. In addition or alternatively, the connector body or the weld collar may include at least one radially-extending protrusion. In one embodiment, the connector body includes an outer surface and the weld collar includes an inner surface configured to provide an interference fit with the outer surface of the connector body. The connector body may include a tapered outer surface and the weld collar may include a tapered inner surface configured to provide an interference fit with the tapered outer surface of the connector body. In one embodiment, the at least one strength member includes aramid yarn. In addition or alternatively, the weld collar may be defined by a plurality of independent segments, and the composite may include a portion of each of the independent segments.

In another embodiment, a method of coupling a fiber optic cable to a fiber optic connector is provided, the fiber optic cable including at least one strength member and the fiber optic connector including a connector body. The method includes positioning the at least one strength member over the connector body and positioning a weld collar over the at least one strength member such that the at least one strength member is at least partially captured between the connector body and the weld collar. The method also includes forming a composite including a portion of the at least one strength member and a portion of at least one of the weld collar or the connector body. In one embodiment, forming the composite includes at least partially melting the weld collar or the connector body.

Forming the composite may include ultrasonically welding the weld collar to the connector body. Ultrasonically welding the weld collar to the connector body may include engaging an ultrasonic welding horn with the weld collar. For example, engaging the ultrasonic welding horn with the weld collar may be performed in an axial direction. Alternatively, engaging the ultrasonic welding horn with the weld collar may be performed in a radial direction. In addition or alternatively, ultrasonically welding the weld collar to the connector body may include applying a vibration of between 30 kHz and 60 kHz to the weld collar for less than one second.

Positioning the weld collar over the at least one strength member may include providing an interference fit between the weld collar and the connector body. In addition or alternatively, the connector body may include a tapered outer surface and the weld collar may include a tapered inner surface, and positioning the weld collar over the at least one strength member may include mating the tapered outer surface with the tapered inner surface.

The connector body or the weld collar may include a plurality of longitudinally-extending teeth defining a plurality of recesses, and positioning the weld collar over the at least one strength member may include distributing the at least one strength member among the plurality of recesses. In addition or alternatively, the connector body or the weld collar may include a plurality of longitudinally-extending teeth, and forming the composite may include at least partially melting the teeth such that the at least partially melted teeth envelope a portion of the at least one strength member. In one embodiment, the connector body or the weld collar includes at least one radially-extending protrusion, and forming the composite includes at least partially melting the at least one protrusion to direct pressurized flow of the at least partially melted protrusion through the at least one strength member.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to fiber optic connectors and fiber optic cable assemblies including the same.

Figure 1:
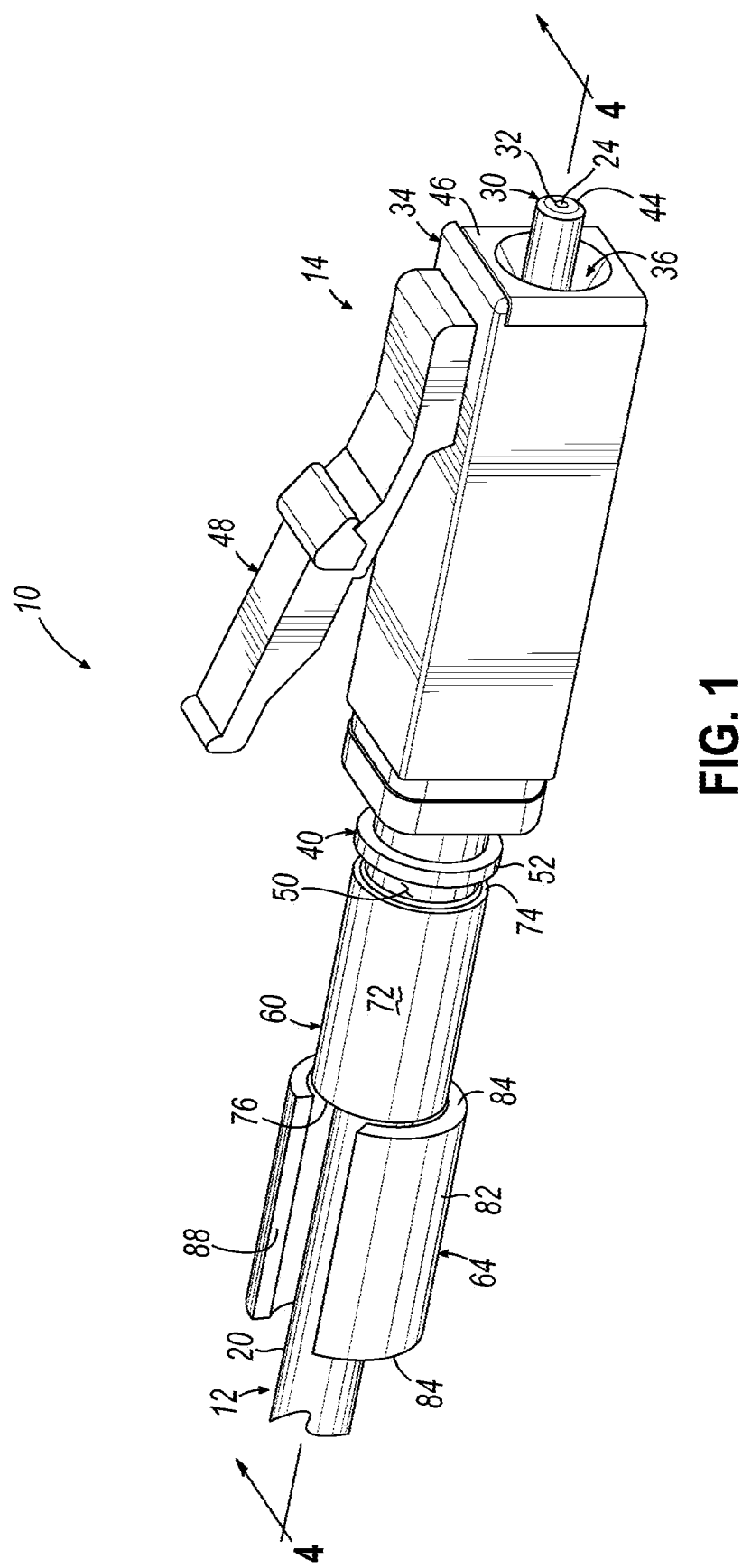
FIG. 1 is a perspective view of a fiber optic cable assembly including a fiber optic cable and a fiber optic connector, and further showing an ultrasonic welding horn, in accordance with an aspect of this disclosure.
Figure 2:
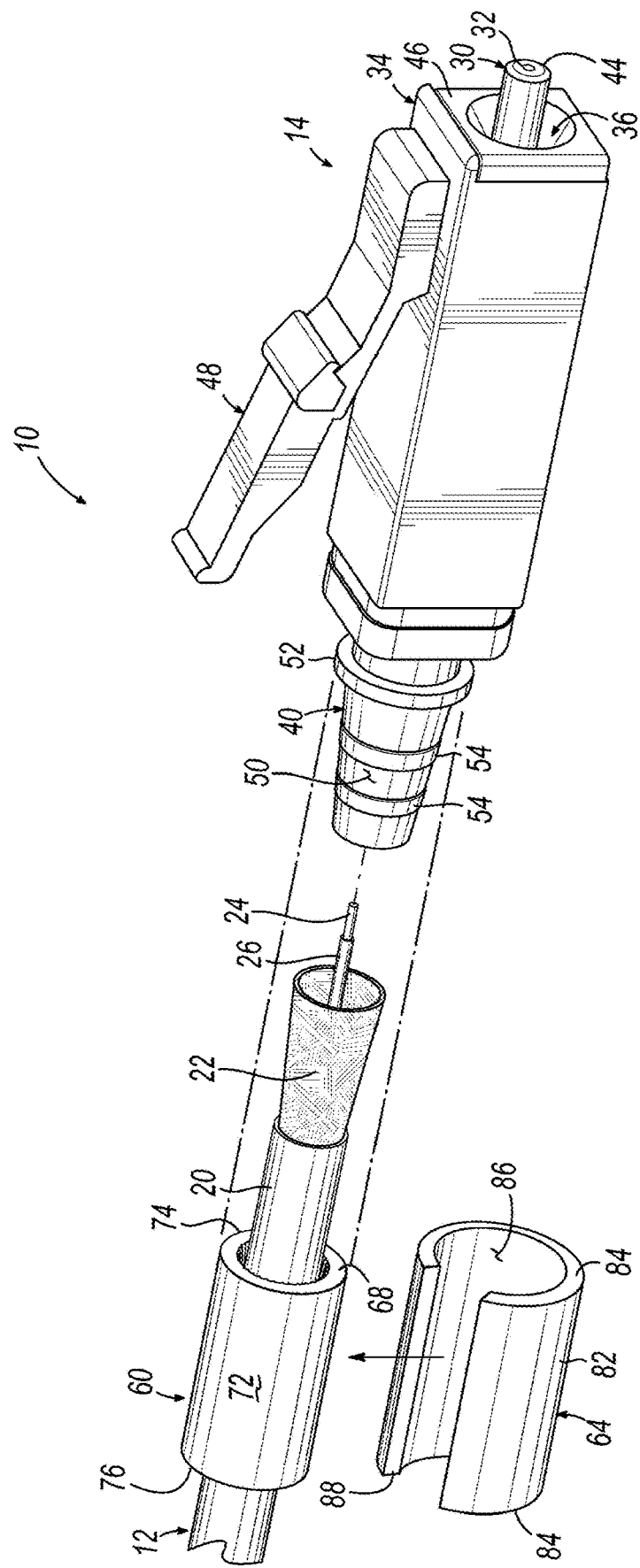
FIG. 2 is an exploded view of the fiber optic cable assembly of FIG. 1, prior to formation of the composite for retaining the strength members of the cable over a portion of the connector.

Referring now to FIGS. 1 and 2, an exemplary fiber optic cable assembly 10 includes a fiber optic cable 12 and a fiber optic connector 14 (also referred to as "optical connector", or simply "connector"). Although the connector 14 is shown in the form of a LC-type connector, the features described below may be applicable to different connector designs. This includes ST, SC, and MU-type connectors, for example, and other single-fiber or multi-fiber connector designs. Similarly, the illustrated cable 12 is merely an example to facilitate discussion, and persons skilled in optical connectivity will appreciate how different cable designs may be terminated with the connector 14 to provide different fiber optic cable assemblies.

As best shown in FIG. 2, the illustrated fiber optic cable 12 includes an outer jacket 20, strength members 22 in the form of aramid yarn, for example, and an optical fiber 24, which itself has a buffer layer 26 ("tight buffer"). A portion of the outer jacket 20 has been removed to expose the strength members 22, which are cut to a desired length for coupling to the connector 14, as discussed in greater detail below. In the embodiment shown, the strength members 22 are interwoven to form a generally unitary structure, but may alternatively be a plurality of generally longitudinally extending discrete fibers 22a (FIGS. 5A-5D).

The illustrated connector 14 includes a ferrule 30 having a ferrule bore 32 ("micro-hole") configured to support the optical fiber 24, a housing 34 having a cavity 36 in which the ferrule 30 and/or an associated ferrule holder (not shown) is received, and a connector body 40 (also referred to as "retention body" or "substrate"). In the embodiment shown, the connector body 40 is defined by a rear portion of the housing 34 (i.e., the elements are unitary structure formed together). The unitary structure may be referred to as the housing or connector body. In alternative embodiments the connector body 40 may be a separate component coupled to the housing 34. The connector body 40 includes a passageway 42 (FIG. 4) for allowing the optical fiber 24 to reach the ferrule bore 32. In one embodiment, the connector body 40 is constructed of a plastic material, such as a thermoplastic material. As shown, a front end 44 of the ferrule 30 ("ferrule end face") projects beyond a front end 46 of the housing 34. The ferrule end face 44 presents an end of the optical fiber 24 for optical coupling with a mating component (e.g., another fiber optic connector; not shown). In this regard, the illustrated connector 14 includes a spring clip 48 for removably coupling the connector 14 with such a mating component.

As shown in FIG. 1, the connector 14 is installed on the fiber optic cable 12 to form the fiber optic cable assembly 10. To this end, the strength members 22 of the cable 12 may extend from the jacket 20 over a rear outer surface 50 of the connector body 40. As best shown in FIG. 2, at least the rear outer surface 50 of the illustrated connector body 40 is tapered radially inwardly in a rearward direction such that at least the rear portion of the connector body 40 has a generally frustoconical shape. The illustrated connector body 40 includes an annular barrier 52 delineating the rear portion of the connector body 40 and which may limit the advancement of the strength members 22 and/or other components over the rear outer surface 50, for example. In the embodiment shown, a pair of radially outward protrusions 54 are positioned on the rear outer surface 50 and extend generally circumferentially thereabout, such that the protrusions 54 may be generally perpendicular to the lengths of the strength members 22. The purposes of the protrusions 54 are discussed in greater detail below.

To assist in retaining the strength members 22 over the connector body 40, a weld collar 60 may be positioned over the strength members 22 such that the strength members 22 are at least partially captured between the connector body 40 and the weld collar 60. In an exemplary embodiment, a portion of the strength members 22 are embedded in the connector body 40 and/or weld collar 60 to physically couple the connector 14 to the cable 12. In other words, the connector 14 and the cable 12 may be coupled together via a composite 62 (FIG. 5D) including a portion of the strength members 22 (as the fiber portion of the composite 62) and a portion of the connector body 40 and/or weld collar 60 (as the matrix portion of the composite 62). An exemplary method for forming such a composite 62 with an ultrasonic welding horn 64 ("sonotrode") is discussed below.

Figure 4:
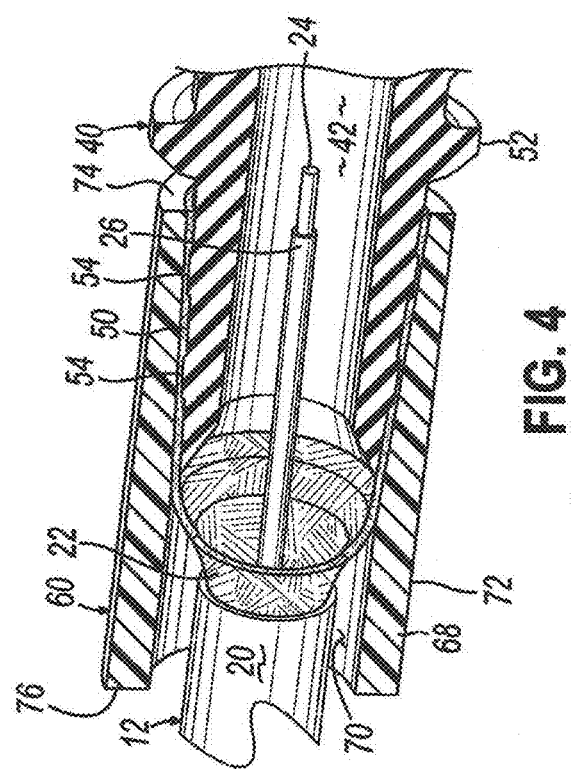
FIG. 4 is a cross sectional view of the weld collar and connector body shown in FIG. 1, illustrating a mating thereof.
Figure 3:
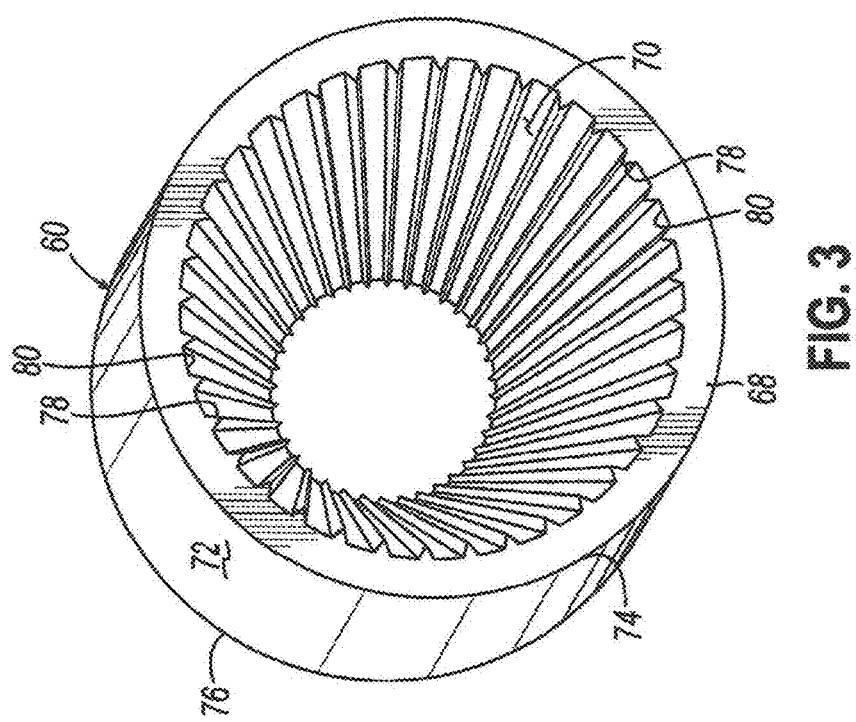
FIG. 3 is a perspective view of the weld collar shown in FIG. 1.

Referring now to FIGS. 3 and 4, the illustrated weld collar 60 includes a generally tube-shaped wall 68 defined by an at least partially tapered inner surface 70 and a generally cylindrical outer surface 72 and extending between first and second ends 74, 76. The inner surface 70 may be tapered radially inwardly in a direction from the first end 74 toward the second end 76. As best shown in FIG. 4, the tapering of the inner surface 70 may be complementary to the tapering of the rear outer surface 50 of the connector body 40. For example, the inner surface 70 and the outer surface 50 may be tapered at a similar angle such that, when the weld collar 60 is advanced sufficiently over the connector body 40 (e.g., from the relative positioning shown in FIG. 2), the inner surface 70 and outer surface 50 may mate and thereby provide one or more interfaces between the weld collar 60 and the connector body 40. Such interfaces may assist in providing an interference fit between the weld collar 60 and the connector body 40. The presence of the strength members 22 between the inner surface 70 and the outer surface 50 may also contribute to such an interference fit. While the wall 68 of the weld collar 60 is shown as being generally circular in cross section, the wall 68 may be of any suitable cross section, such as planar or polygonal. For example, the cross sectional shape of the wall 68 including one or both of the surfaces 70, 72 may be selected to correspond to a cross sectional shape of the connector body 40, such as the rear outer surface 50 thereof.

In the embodiment shown, a plurality of radially inward standoffs or teeth 78 are positioned on the inner surface 70 of the weld collar 60 and extend generally longitudinally therealong in a circumferential array, such that the teeth 78 may be generally parallel to the lengths of the strength members 22. The illustrated teeth 78 are each generally triangular in cross section and are spaced apart from each other to define a plurality of recesses 80 for receiving and/or separating the strength members 22 when the weld collar 60 is positioned over the strength members 22. In the embodiment shown, the teeth 78 are spaced apart from each other in generally equal intervals such that the recesses 80 are generally uniform in size and shape. In this manner, the teeth 78 and recesses 80 may assist in evenly distributing the strength members 22 perimetrically (e.g., circumferentially) between the weld collar 60 and the connector body 40.

In one embodiment, the weld collar 60 is constructed of a material that is compatible with the material of the connector body 40 for ultrasonic welding. For example, the weld collar 60 may be constructed of a plastic material, such as a thermoplastic material. The weld collar 60 and the connector body 40 may be constructed of a same material. In addition or alternatively, the weld collar 60 and/or the connector body 40 may be constructed of a material compatible with the strength members 22 for mechanically attaching to the strength members 22, such as when partially melted and reset thereover.

Referring again primarily to FIGS. 1 and 2, the ultrasonic welding horn 64 may be sized and shaped to generally conform to one or more features of the weld collar 60. In this regard, the illustrated welding horn 64 includes a generally tube-shaped sleeve 82 having a pair of faces 84 and an inner surface 86. A slot 88 extends radially through the sleeve 82 along the length thereof and is sized to allow the sleeve 82 to pass radially over the cable 12, for example, so that the sleeve 82 may access the weld collar 60 in an axial direction along the cable 12. The sleeve 82 may be sized and configured for operative engagement between a face 84 of the sleeve 82 and an end, such as the second end 76, of the weld collar 60 (e.g., axial engagement), and/or for operative engagement between the inner surface 86 of the sleeve 82 and the outer surface 72 of the weld collar 60 (e.g., radial engagement). While not shown, the welding horn 64 may be coupled to various components of an ultrasonic welding system, such as a transducer, a converter, a booster, an electronic ultrasonic generator, and/or a controller in a known manner for supplying ultrasonic energy to the welding horn 64.

Figure 5A:
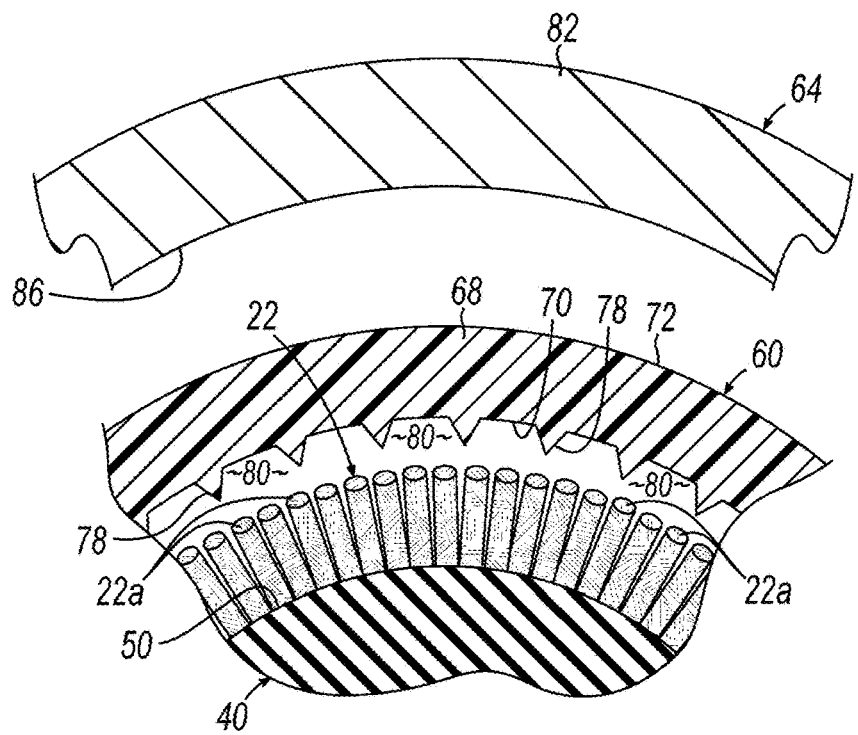
FIG. 5A schematically illustrates the connector body, strength members, weld collar, and welding horn shown in FIG. 1 prior to ultrasonic welding.

Referring now to FIGS. 5A-5D, a method of coupling the connector 14 to the cable 12 by forming a composite 62 including the strength members 22 of the cable 12 is shown schematically. In the embodiment shown, at least the ends of the strength members 22 are provided as discrete fibers 22a. Alternatively, the strength members 22 may be interwoven to form a generally unitary structure (e.g., as shown in FIG. 2). Initially, the strength members 22a are exposed from the jacket 20 and positioned over the rear outer surface 50 of the connector body 40 (FIG. 5A). For example, the strength members 22a may be advanced axially over the rear outer surface 50 of the connector body 40 (e.g., from the relative positioning shown in FIG. 2) and limited by the barrier 52. In one embodiment, the strength members 22a may be advanced over both radial protrusions 54 (e.g., as shown in FIG. 4) to provide a desired length of the strength members 22a over the rear outer surface 50. In this manner, one or both protrusions 54 (e.g., the forwardmost protrusion 54) may serve as a gauge for determining a sufficient length of the strength members 22a over the rear outer surface 50 for coupling purposes. As shown, the weld collar 60 and/or welding horn 64 may be positioned within the vicinity of the strength members 22a and/or connector body 40.

Figure 5B:
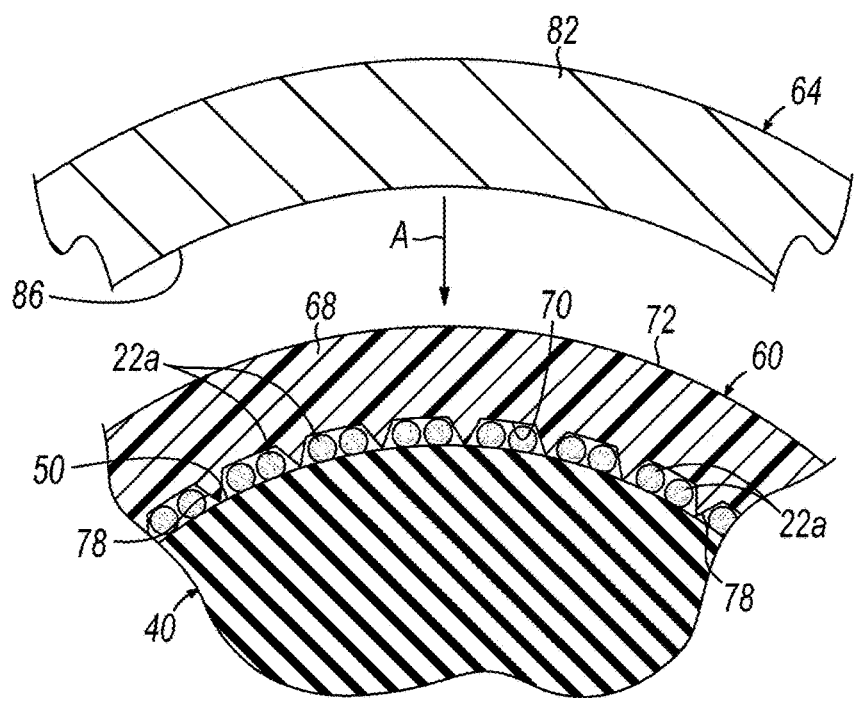
FIG. 5B schematically illustrates the strength members captured between the connector body and the weld collar, and the welding horn being moved toward the weld collar.

The weld collar 60 is then positioned over the strength members 22a and rear outer surface 50 of the connector body 40 to provide one or more interfaces between the weld collar 60 and the connector body 40 (FIG. 5B). For example, the weld collar 60 may be advanced axially over the strength members 22a (e.g., from the relative positioning shown in FIG. 2) and limited by the barrier 52 and/or by a resulting interference fit. As shown, the strength members 22a are captured or sandwiched between the rear outer surface 50 of the connector body 40 and the inner surface 70 of the weld collar 60. In this regard, the teeth 78 may force the strength members 22a to become distributed in the recesses 80 in a generally even or uniform manner. This may inhibit the strength members 22a from undesirably clumping together or otherwise interfering with the desired interfaces between the weld collar 60 and the connector body 40. In cases where the ends of the fibers 22a are initially interwoven (e.g., as shown in FIG. 2), the teeth 78 may also assist in separating discrete fibers 22a of the strength members 22 from each other and distributing the discrete fibers 22a in the recesses 80. In the embodiment shown, each recess 80 is sized to receive two strength members 22a. However, each recess 80 may be sized to receive any suitable number of strength members 22a, such as a single strength member 22a or more than two strength members 22a, for evenly distributing the strength members 22a.

Figure 5C:
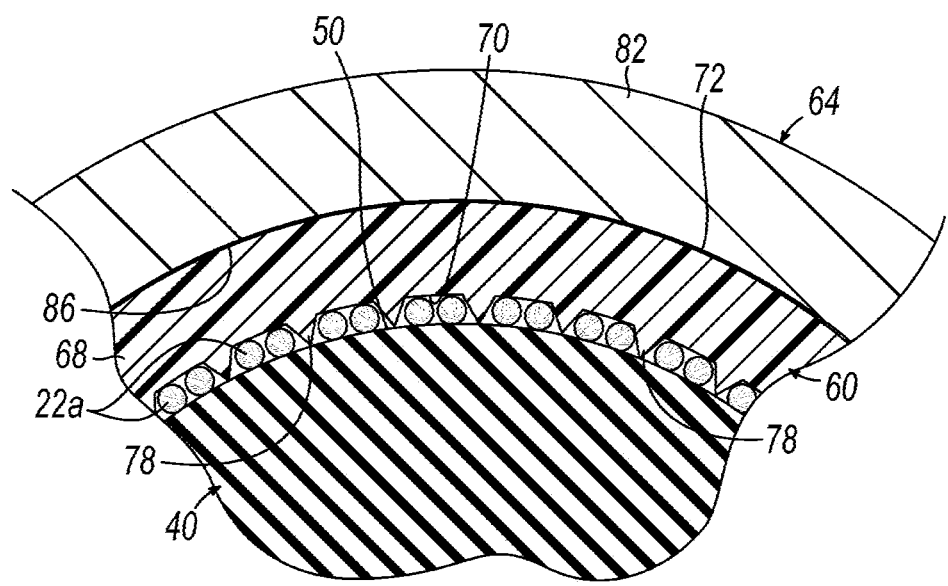
FIG. 5C schematically illustrates the welding horn engaging the weld collar for ultrasonic welding of the weld collar to the connector body.

As shown, the welding horn 64 is moved toward the weld collar 60 in the direction of the arrow A and positioned in operative engagement with the weld collar 60 for applying ultrasonic energy thereto (FIG. 5C). While the schematic illustration shows the welding horn 64 moving radially toward the weld collar 60 and positioned over the weld collar 60 such that the inner surface 86 of the welding horn 64 engages the outer surface 72 of the weld collar 60 in a radial direction, the welding horn 64 may be advanced axially over the weld collar 60 (e.g., from the relative positioning shown in FIG. 1) to achieve a similar operative engagement in the radial direction. Alternatively, the welding horn 64 may be advanced axially toward the weld collar 60 such that a face 84 of the welding horn 64 engages an end, such as the second end 76, of the weld collar 60 in an axial direction. The direction of operative engagement (e.g., radial or axial) may be influenced by the size and/or shape of the welding horn 64 relative to the weld collar 60.

In one embodiment, the welding horn 64 may press against the weld collar 60 radially and/or axially (e.g., depending on the direction of operative engagement) to apply a load for assisting in creating or maintaining the interfaces between the weld collar 60 and the connector body 40. For example, an axial force applied by the welding horn 64 to the weld collar 60 may cause an applied normal force at the interfaces between the weld collar 60 and the connector body 40 due to the tapers of the inner surface 70 of the weld collar 60 and the outer surface 50 of the connector body 40, while a radial force applied by the welding horn 64 to the weld collar 60 (e.g., in a direction generally normal to the interfaces between the weld collar 60 and the connector body 40) may directly apply a normal force to the interfaces.

In any event, with the welding horn 64 in operative engagement with the weld collar 60, the welding horn 64 applies a high frequency vibration, such as within a range of approximately 30 kHz to approximately 60 kHz, to the weld collar 60 for a short period of time, such as less than one second. In one embodiment, the applied high frequency vibration may be approximately 40 kHz. The high frequency vibration is directed through the wall 68 of the weld collar 60 to the interfaces between the weld collar 60 and the connector body 40. In one embodiment, the teeth 78 and/or radial protrusions 54 may assist in directing the ultrasonic energy to such interfaces. The ultrasonic energy causes localized partial melting of portions of the weld collar 60 and connector body 40 at or near the interfaces. These partially melted or molten portions may envelope portions of the strength members 22a. For example, the teeth 78 and/or protrusions 54 may be at least partially melted and in their molten states may flow around and/or through the strength members 22a. In one embodiment, the teeth 78 extending generally parallel to the strength members 22a may allow encapsulation of the strength members 22a as the teeth 78 partially melt and flow around the strength members 22a, while the protrusions 54 extending generally perpendicular to the strength members 22a may allow direct pressurized flow through the strength members 22a as the protrusions 54 partially melt.

Figure 5D:
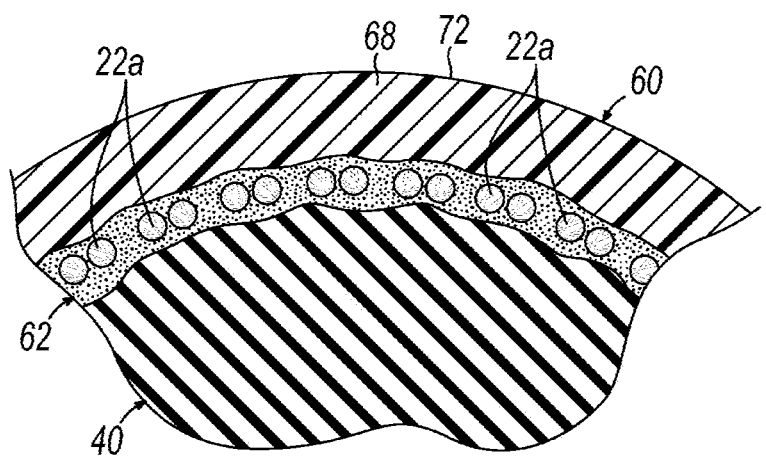
FIG. 5D schematically illustrates the weld collar and connector body welded together after ultrasonic welding, with the strength members embedded therein to form a composite of the strength members and the surrounding material.

After application of the high frequency vibration, the welding horn 64 may be removed and the molten portions of the weld collar 60 and connector body 40 may be allowed to reset (FIG. 5D). Upon resetting of the molten portions, the weld collar 60 and connector body 40 may be joined together and the strength members 22a may be firmly embedded in the reset material of the weld collar 60 and/or connector body 40, thereby forming a composite 62 of the strength members 22a and the surrounding material of the weld collar 60 and/or connector body 40. The resulting composite 62 including the strength members 22a firmly attaches the strength members 22a to both the weld collar 60 and the connector body 40 to securely couple the connector 14 to the cable 12.

By coupling the connector 14 to the cable 12 via the composite 62 including the strength members 22a, the need for crimping may be eliminated. Moreover, improved retention and uniform distribution of the strength members 22a may be achieved while avoiding or eliminating mechanical stress on the connector body 40 that would otherwise be caused by crimping a conventional crimp body. The strength of the composite 62 including the strength members 22a may be sufficient to bear the load of normal qualification and service conditions for the fiber optic cable assembly 10.

It will be appreciated that the composite 62 including the strength members 22a may eliminate the need to form metal around a plastic substrate, as is done for conventional crimping, thereby improving overall product durability and eliminating a hard to detect failure mode of the plastic substrate. For example, the connector body 40 may be less susceptible to cracking than a conventional crimp body. The process to form the composite 62 may also be more robust than crimping, allowing for less expensive material handling and easier integration into automated systems. In addition, the weld collar 60, which may be constructed of molded plastic, may be cost effective as compared to a machined metal crimp band, such as a brass or aluminum crimp band.

While the exemplary weld collar 60 has been shown and described above, other configurations of the weld collar 60 may be used. For example, a slotted or partially slotted weld collar (not shown) may include a slot extending axially along at least a portion of the wall of the weld collar and radially therethrough, and may allow for a radial strain to apply force during the welding process and/or may provide a mechanical spring force caused by advancing the weld collar over the connector body 40. In addition or alternatively, a segmented weld collar may be provided by dividing the exemplary weld collar 60 into two or more segments (as shown in FIG. 3 where weld collar 60 is divided along the dashed lines) which may be independently positioned and welded to the connector body 40, such as via a radially applied force on each segment. Such a radially applied force may be applied sequentially or simultaneously with a common welding horn 64, for example. In cases where the weld collar is defined by a plurality of independent segments, the composite may include a portion of each of the independent segments.

In the embodiment shown, the teeth 78 are provided on the weld collar 60 and protrude radially inwardly, and the protrusions 54 are provided on the connector body 40 and protrude radially outwardly. However, other configurations may be used. For example, the teeth 78 may be provided on the connector body 40 and may protrude radially outwardly, and/or the protrusions 54 may be provided on the weld collar 60 and may protrude radially inwardly.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A fiber optic cable assembly comprising:
    a fiber optic cable including at least one strength member;
    a fiber optic connector including a connector body;
    a weld collar positioned such that the at least one strength member is at least partially captured between the connector body and the weld collar;
    a composite including a portion of the at least one strength member and a portion of at least one of the weld collar or the connector body; and
        wherein the connector body or the weld collar includes a plurality of longitudinally-extending teeth defining a plurality of recesses for receiving the at least one strength member.

2. The fiber optic cable assembly of claim 1, wherein the composite includes a portion of the weld collar and a portion of the connector body.

3. The fiber optic cable assembly of claim 1, wherein the composite is formed by ultrasonically welding the weld collar to the connector body.

4. The fiber optic cable assembly of claim 1, wherein the weld collar comprises a plastic material.

5. The fiber optic cable assembly of claim 1, wherein the connector body or the weld collar includes at least one radially-extending protrusion.

6. The fiber optic cable assembly of claim 1, wherein the connector body includes an outer surface and the weld collar includes an inner surface configured to provide an interference fit with the outer surface of the connector body.

7. The fiber optic cable assembly of claim 1, wherein the connector body includes a tapered outer surface, and wherein the weld collar includes a tapered inner surface configured to provide an interference fit with the tapered outer surface of the connector body.

8. The fiber optic cable assembly of claim 1, wherein the at least one strength member includes aramid yarn.

9. The fiber optic cable assembly of claim 1, wherein the weld collar is defined by a plurality of independent segments, and wherein the composite includes a portion of each of the independent segments.

10. A method of coupling a fiber optic cable to a fiber optic connector, the fiber optic cable including at least one strength member, the fiber optic connector including a connector body, the method comprising:
    positioning the at least one strength member over the connector body;
    positioning a weld collar over the at least one strength member such that the at least one strength member is at least partially captured between the connector body and the weld collar;
    wherein the connector body or the weld collar includes a plurality of longitudinally extending teeth defining a plurality of recesses for receiving the at least one strength member; and
    forming a composite including a portion of the at least one strength member and a portion of at least one of the weld collar or the connector body.

11. The method of claim 10, wherein forming the composite includes at least partially melting the weld collar or the connector body.

12. The method of claim 10, wherein forming the composite includes ultrasonically welding the weld collar to the connector body.

13. The method of claim 12, wherein ultrasonically welding the weld collar to the connector body includes engaging an ultrasonic welding horn with the weld collar.

14. The method of claim 13, wherein engaging the ultrasonic welding horn with the weld collar is performed in an axial direction.

15. The method of claim 13, wherein engaging the ultrasonic welding horn with the weld collar is performed in a radial direction.

16. The method of claim 12, wherein ultrasonically welding the weld collar to the connector body includes applying a vibration of between 30 kHz and 60 kHz to the weld collar for less than one second.

17. The method of claim 10, wherein positioning the weld collar over the at least one strength member includes providing an interference fit between the weld collar and the connector body.

18. The method of claim 10, wherein the connector body includes a tapered outer surface and the weld collar includes a tapered inner surface, and wherein positioning the weld collar over the at least one strength member includes mating the tapered outer surface with the tapered inner surface.

19. The method of claim 10, wherein positioning the weld collar over the at least one strength member includes distributing the at least one strength member among the plurality of recesses.

20. The method of claim 10, wherein forming the composite includes at least partially melting the teeth such that the at least partially melted teeth envelope a portion of the at least one strength member.

21. The method of claim 10, wherein the connector body or the weld collar includes at least one radially-extending protrusion, and wherein forming the composite includes at least partially melting the at least one protrusion to direct pressurized flow of the at least partially melted protrusion through the at least one strength member.

* * * * *